June 26, 1923.
J. J. WITT
LATHE CARRIAGE ATTACHMENT
Filed Oct. 29, 1919
1,460,121
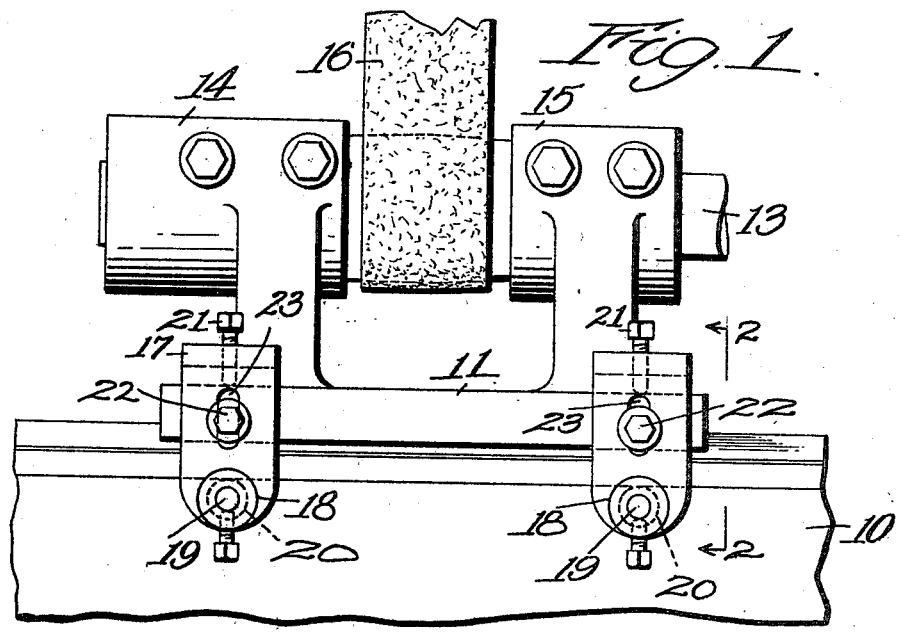
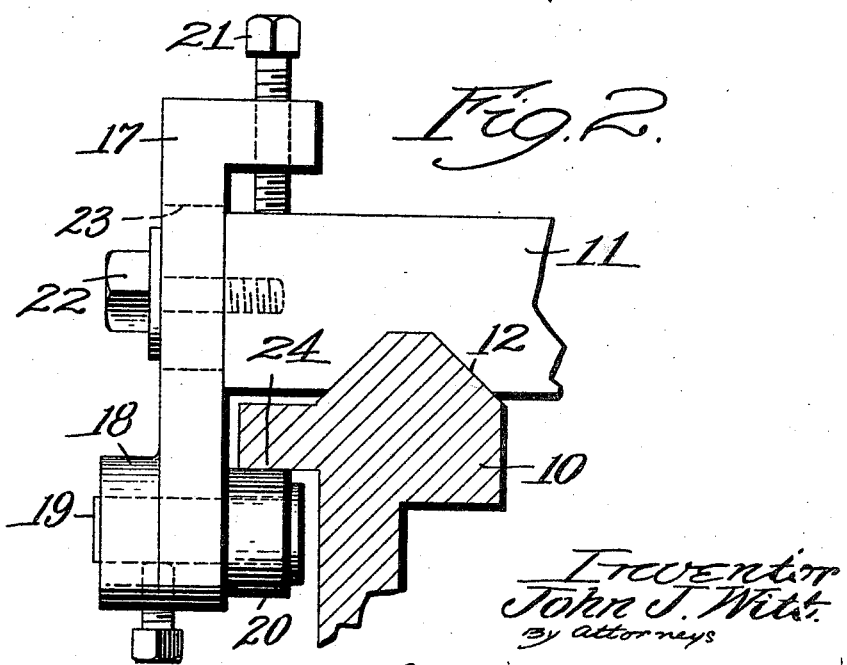

Patented June 26, 1923.

1,460,121

UNITED STATES PATENT OFFICE.

JOHN J. WITT, OF WINCHENDON, MASSACHUSETTS, ASSIGNOR TO GOODSPEED MACHINE COMPANY, A CORPORATION OF MASSACHUSETTS.

LATHE-CARRIAGE ATTACHMENT.

Application filed October 29, 1919. Serial No. 334,223.

*To all whom it may concern:*

Be it known that I, JOHN J. WITT, a citizen of the United States, residing at Winchendon, in the county of Worcester and State of Massachusetts, have invented a new and useful Lathe-Carriage Attachment, of which the following is a specification.

This invention relates to an attachment for a lathe carriage, designed to prevent upward displacement of the carriage on its support.

In certain types of wood-working machinery, a spindle driven by an over-head belt is mounted in a carriage which is fed forward automatically but which must be frequently withdrawn manually. If the carriage is mounted on ways in the usual manner, the upward pull of the belt causes the carriage to bind on its support and makes frequent withdrawal of the carriage extremely laborious.

It is the object of my invention to provide an attachment for such a carriage by which the carriage is held securely in position while at the same time easy movement of the carriage is attained.

While particularly designed for use on a lathe carriage, it will be understood that my carriage attachment is also capable of more general application.

My invention also relates to certain arrangements and combinations of parts hereinafter described and more particularly pointed out in the appended claim.

A preferred form of my invention is shown in the drawings, in which—

Fig. 1 is a side elevation of a lathe carriage with my attachment applied thereto, and Fig. 2 is a partial sectional elevation taken along the line 2—2 in Fig. 1.

Referring to the drawings, I have shown a portion of a lathe bed 10 on which a carriage 11 is slidably mounted, the bed being provided with the usual guides or ways, one of which is shown at 12 in Fig. 2.

In the particular carriage shown in the drawings, a spindle 13 is rotatably mounted in bearings 14 and 15 on the carriage 11 and is driven by an over-head belt 16 which exerts an upward pull on the carriage, tending to lift the same off of the ways 12.

To prevent such action, I provide one or more brackets 17 mounted on the sides of the carriage 11 and each having a boss 18 at its lower end supporting a stud 19 on which a roller 20 is rotatably mounted. Each bracket may be vertically adjusted by a set screw 21 engaging an upper surface of the carriage 11, and each bracket is held securely in adjusted position by a binding screw 22 extending through a slot 23 in the bracket and threaded onto the carriage 11. The rollers 20 engage the under sides of flanges or ribs 24 on the bed 10.

Any desired number of brackets 17 may be used, and preferably one bracket will be mounted on each corner of the carriage 11. With these attachments in use and properly adjusted, it will be seen that upward displacement of the carriage 11 away from the bed 10 is prevented while, at the same time, the upward pull of the belt 16 is taken by the rollers 20. There is, therefore, little sliding friction to be overcome and movement of the carriage 11 along the ways is readily accomplished.

Having thus described my invention, it will be evident that changes and modifications can be made therein by those skilled in the art within the spirit and scope of my invention as set forth in the claim, and I do not wish to be otherwise limited to the details herein disclosed, but what I claim is:—

In a lathe, in combination, a carriage, a support on which said carriage is slidably mounted, rollers engaging an under surface of said support to prevent upward movement of said carriage relatively to said support, brackets for said rollers mounted on the side of said carriage for vertical adjustment thereon, said brackets each having an upward offset extension with a screw threaded therein and engaging a horizontal upper surface of said carriage for moving said bracket upward, and additional means to clamp said brackets in adjusted position against the side of said carriage.

In testimony whereof I have hereunto affixed my signature.

JOHN J. WITT.